US007917908B2

(12) United States Patent
Jenkins et al.

(10) Patent No.: US 7,917,908 B2
(45) Date of Patent: Mar. 29, 2011

(54) FLOW LOOKAHEAD IN AN ORDERED SEMAPHORE MANAGEMENT SUBSYSTEM

(75) Inventors: Steven Kenneth Jenkins, Raleigh, NC (US); Ross Boyd Leavens, Cary, NC (US); Robert Brian Likovich, Jr., Raleigh, NC (US); Wesley Erich Queen, Raleigh, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/137,818

(22) Filed: Jun. 12, 2008

(65) Prior Publication Data

US 2008/0244130 A1 Oct. 2, 2008

Related U.S. Application Data (63) Continuation of application No. 10/247,602, filed on Sep. 19, 2002, now Pat. No. 7,406,690.

(60) Provisional application No. 60/325,069, filed on Sep. 26, 2001.

(51) Int. Cl.
*G06F 9/46* (2006.01)
*G06F 12/00* (2006.01)
*G06F 13/14* (2006.01)
*G06F 13/38* (2006.01)
*G06F 13/00* (2006.01)
*G06F 13/28* (2006.01)

(52) U.S. Cl. ........ 718/104; 710/200; 710/240; 710/243; 710/244; 711/150; 711/151

(58) Field of Classification Search .................. 718/104; 710/200, 240, 243, 244; 711/150, 151
See application file for complete search history.

(56) References Cited

U.S. PATENT DOCUMENTS

| 4,805,106 A | 2/1989 | Pfeifer |
| 4,907,228 A | 3/1990 | Bruckert et al. |
| 5,142,632 A | 8/1992 | Tychon et al. |
| 5,159,686 A | 10/1992 | Chastain et al. |
| 5,233,701 A | 8/1993 | Nakata |
| 5,261,106 A | 11/1993 | Lentz et al. |
| 5,276,886 A | 1/1994 | Dror |
| 5,339,443 A | 8/1994 | Lockwood |
| 5,485,593 A | 1/1996 | Baker |
| 5,548,780 A | 8/1996 | Krein |

(Continued)

FOREIGN PATENT DOCUMENTS

EP 0953903 A2 11/1999

(Continued)

OTHER PUBLICATIONS

IBM Technical Disclosure Bulletin vol. 30, No. 3, Aug. 1987, p. 1203, "Non-Atomic (Ordered) Semaphore Operations".

(Continued)

*Primary Examiner* — Qing Wu
(74) *Attorney, Agent, or Firm* — Yee & Associates, P.C.; Joseph Petrokaitis (57) ABSTRACT

In an ordered semaphore management system a pending state allows threads not competing for a locked semaphore to bypass one or more threads waiting for the same locked semaphore. The number of pending levels determines the number of consecutive threads vying for the same locked semaphore which can be bypassed. When more than one level is provided the pending levels are prioritized in the queued order.

8 Claims, 6 Drawing Sheets

U.S. PATENT DOCUMENTS

| | | | |
|---|---|---|---|
| 5,613,139 A | 3/1997 | Brady | |
| 5,664,092 A | 9/1997 | Waites | |
| 5,675,829 A | 10/1997 | Oskouy et al. | |
| 5,696,939 A | 12/1997 | Iacobovici et al. | |
| 5,734,909 A | 3/1998 | Bennett | |
| 5,842,018 A | 11/1998 | Atkinson et al. | |
| 5,852,731 A | 12/1998 | Wang et al. | |
| 5,862,180 A | 1/1999 | Heinz | |
| 5,864,653 A | 1/1999 | Tavallaci et al. | |
| 5,893,157 A | 4/1999 | Greenspan et al. | |
| 5,901,308 A | 5/1999 | Cohn et al. | |
| 6,018,785 A | 1/2000 | Wenniger | |
| 6,026,427 A | 2/2000 | Nishihara et al. | |
| 6,029,190 A | 2/2000 | Oliver | |
| 6,070,254 A | 5/2000 | Pratt et al. | |
| 6,079,013 A | 6/2000 | Webb et al. | |
| 6,105,085 A | 8/2000 | Farley | |
| 6,119,246 A | 9/2000 | McLaughlin et al. | |
| 6,122,713 A | 9/2000 | Huang et al. | |
| 6,125,401 A | 9/2000 | Huras et al. | |
| 6,128,706 A | 10/2000 | Bryg et al. | |
| 6,131,094 A | 10/2000 | Gord | |
| 6,134,579 A | 10/2000 | Tavallaei et al. | |
| 6,134,619 A | 10/2000 | Futral et al. | |
| 6,154,847 A | 11/2000 | Schofield et al. | |
| 6,161,169 A | 12/2000 | Cheng | |
| 6,173,313 B1 | 1/2001 | Klots et al. | |
| 6,182,108 B1 | 1/2001 | Williams et al. | |
| 6,199,094 B1 | 3/2001 | Presler-Marshall | |
| 2002/0138544 A1 | 9/2002 | Long | |

FOREIGN PATENT DOCUMENTS

| | | |
|---|---|---|
| EP | 1033654 A1 | 9/2000 |
| JP | 4361340 | 12/1992 |
| JP | 8329019 | 12/1996 |
| JP | 9044376 | 2/1997 |
| JP | 9231123 | 2/1999 |
| JP | 11039176 | 2/1999 |
| JP | 11272480 | 10/1999 |
| JP | 2001005694 | 1/2001 |
| JP | 2001022720 | 1/2001 |
| WO | 9603697 | 2/1996 |

OTHER PUBLICATIONS

Research Disclosure, Aug. 2000, p. 1442, article 436131, "User lever writing to a pinned kernel buffer in an SMP system".

IBM Technical Disclosure Bulletin vol. 37, No. 12, Dec. 1994, "Error Handler Installation Procedure", pp. 239-240.

IBM Technical Disclosure Bulletin vol. 37, No. 06A, Jun. 1994, "Shared Memory Cluster—A Scalable Multiprocessor Design", pp. 503-507.

IBM Technical Disclosure Bulletin vol. 30, No. 5, Oct. 1987, "Fast Method for Simultaneous Exclusive Table Modifications", pp. 348-350.

IBM Technical Disclosure Bulletin vol. 38 No. 4. Apr. 1995, "Hardware Contention Serialization Algorithm", pp. 73-77.

IBM Technical Disclosure Bulletin vol. 33, No. 4. Sep. 1990, "Store Purge Pipeline for Mid-Range Processor", pp. 299-301.

IBM Technical Disclosure Bulletin vol. 36, No. 6A, Jun. 1993, "Emulator DosExit Processing for Reporting Errors", pp. 255-256.

Research Disclosure No. 317, Sep. 1990, "Improved Error Detection Using MP Fields".

IBM Technical Disclosure Bulletin No. 9, Feb. 1991, "System Support for Multiprocessing Without an Atomic Storage". pages 18-23.

E. Chang, "N-Philosophers: an Exercise in Distributed Control", Computer Networks vol. 4, No. 2 Apr. 1980, pp. 71-76.

P. Bohannon et al., "Recoverable User-Level Mutual Exclusion", Proceedings, 7'h IEEE Symposium on Parallel and Distributed Processing (Cat. No. 95TB8131), 1995, pp. 293-301.

J. Thomley et al., "Monotonic counters: a New Mechanism for Thread Syncrhonization", Proceedings 14'h International Parallel and Distributed Processing Symposium, IPDPS 2000, pp. 573-582.

K. C. Tai et al., "VP: A New Operation for Semaphores", Operating Systems Review, vol. 30, No. 3, Jul. 1996, pp. 5-11.

Mei Chen Chia et al., "A Resource Synchronization Protocol for Multiprocessor Real-Time Systems", Proceedings of the 1994 International Conference on Parallel Processing, Pt. vol. 3, 1994, pp. 159-162.

Heng Liao et al., "Hardware Support for Process Synchronization Algorithms", Mini-Micro Systems, vol. 16, No. 9, Sep. 1995, pp. 7-13.

Chung Wu Chaio et al., "The Design and Implementation of a Distributed Semaphore Facility: D1SEM", Proceedings of the National Science Council, Republic of China, Part A, vol. 19, No. 4, Jul. 1995, pp. 319-320.

D. Scholefield, "Proving Properties of Real-Time Semaphores", Science of Computer Programming, vol. 24, No. 2, Apr. 1995, pp. 159-181.

D. Weiss, "Shared Bus Semaphore Detector Proposal", Motorola Technical Developments, vol. 3, Mar. 1983, pp. 74-78.

J. Milde et al., "Realization of Synchronization Tools and their Efficiency in the Multiprocessor System M5PS", 10th IMACS World Congress on System Simulation and Scientific Computation, vol. 1, 1982, pp. 333-335.

N. Wait, "VME—a Microcomputer Bus for Europe", New Electronics vol. 15, No. 16, Aug. 17, 1992, pp. 57-58.

N. Marovac, "Interprocess Syncrhonization and Communication in Distributed Architectures", 3rd International Conf. on Computer Science) Chile, 1983 pp. 1-16.

N. Marovac, "On Interprocess Interaction in Distributed Architectures", Computer Architecture News vol. II, No. 4, Sep. 1983, pp. 17-22.

T. Balph, "Interprocessor Communication in a Tightly coupled Multiple Processor Architecture", Second Annual Phoenix Conference on Computers and Communications, 1983 Conf. Proceedings pp. 21-25.

FLOW LOOKAHEAD IN AN ORDERED SEMAPHORE MANAGEMENT SUBSYSTEM

CROSS-REFERENCE TO RELATED APPLICATIONS

Under 35 USC §120, this application is a continuation application and claims the benefit of priority to application Ser. No. 10/247,602, filed Sep. 19, 2002, now U.S. Pat. No. 7,406,690, issued Jul. 29, 2008 entitled Flow Lookahead in an Ordered Semaphore Management Subsystem, all of which is incorporated herein by reference.

This application claims the benefit of the filing date of provisional application Ser. No. 60/325,069, filed Sep. 26, 2001 for "Flow Lookahead In Ordered Semaphore Management".

FIELD OF THE INVENTION

This invention relates to ordered semaphore management systems and more particularly to a flow look ahead method and apparatus for bypassing the existing head of an ordered semaphore queue to permit a subsequent thread in the ordered semaphore queue to contemporaneously access a different semaphore value.

BACKGROUND

While the invention is generic in nature and capable of use with a large variety of multi-threaded processor systems, it will be described in conjunction with a multi-threaded processor system such as the IBM Part No. IBM32NPR161EPXCAE133 Network Processor which employs a plurality of processors and threads each of which concurrently process data frames which may be from the same or different data flows. The individual threads/processors share common resources in the network processor. Semaphores defined to be associated with specific resources are used to allocate the specific resources to the individual threads as requested.

Within such a network processor several data frames are processed at the same time. Each data frame is processed by one processor/thread. Each processor/thread operates independently from all the other processors/threads. Thus, as the software (picocode) processes a data frame, the software has no knowledge of other frames which have been, are being, or will be processed. As data frames are processed, a thread may need access to a shared resource. This shared resource is shared among all threads. To allow a thread access to the resource without interference from other threads, semaphores are used. A semaphore is a mechanism which allows a processor/thread to use a resource without interference from another processor/thread. Semaphores exist in almost every multi-processor environment where multiple processors can access common resources. A semaphore is used to ensure that one and only one processor/thread has "ownership" or use of a given resource at any given time.

A network processor is a multi-processor environment with resources which can be accessed by all processors/threads. Thus, semaphores are an intricate part of network processors. As discussed above, network processors process data frames which belong to one or more data flows. Traditionally, semaphores are implemented in software using "read modify write" or "test and set" instructions. When these instructions are used as a basis to create and allocate semaphores, valuable system resources must be used. To implement a semaphore, system memory must be used. To access a semaphore, several lines of code must be executed. If these system resources were not used for semaphore implementation, they could be used for other functions or provide a performance increase by not executing extra line(s) of code.

When semaphores are implemented in software, several lines of code must be executed to access and lock the semaphore, impacting performance. If the semaphore is unavailable (locked by another thread/processor), the software would need to poll on the semaphore. This would waste valuable bandwidth on the arbitrated memory holding semaphore locks to be accessed by all threads/processors. To implement a fair semaphore access in software requires more system memory and lines of code. For example, if a semaphore is locked, the thread/processor would need to put itself in a queue waiting for access. This queue would be implemented in system memory and require software management, impacting performance. This allows threads/processors to have fair access to resources.

In a software semaphore environment, multiple threads/processors cannot unlock their respective semaphores at the same time. Typically, all the semaphores are in the same system memory. Each thread/processor must arbitrate to access the memory to unlock their semaphore. This may add to the processing time of other threads/processors waiting to access the same memory to access the semaphore locks. The same is true for locking semaphores. When semaphores are implemented in software, only one semaphore can be unlocked/locked at a time since all the semaphores reside in a common area of system memory.

In the IBM Network Processor System identified above a device termed Completion Unit monitors the order in which frames or packets in a flow are processed by the threads or Dyactic Protocol Processor Units (DPPUs) and generates information used by a semaphore sub-system to control the order in which semaphores are assigned. Such systems require ordered semaphores which must perform two functions. First, the well known semaphore function, ensure that one and only one processor/thread has access to a single resource at any time. And second, ordered semaphores must ensure that the processors/threads which are processing data frames of the same data flow access the common resource in frame order, for example, an e-mail message which must be encrypted using an encryption co-processor shared among all of the processors/threads. The encryption of the data frames must occur in order to properly encrypt the message. The software would use an ordered semaphore mechanism to access the encryption co-processor.

This would ensure two things. First, only one processor/thread accesses the co-processor at a time. And second, the encryption of the data frames of the data flow (e-mail message) occurs in order. Ordered Semaphores are needed since processing time for each data frame can be different. Data frames from the same data flow may take different amounts of time to process. For example, tree searches for each data frame can take different amounts of time. Threads which share a common ALU may stall occasionally to allow the other thread to process data. Thus, frames in the same data flow being processed by different threads will attempt to access a shared resource at different times and not necessarily in data flow order. Thus, ordered semaphores are required to ensure the shared resource is accessed in data flow order.

The Completion Unit logic block contains all the information required to put processed data frames (received from processors/threads) back in the correct order for each data flow. U.S. Pat. No. 6,633,920, issued on Oct. 14, 2003, and U.S. Pat. No. 6,977,928, issued on Dec. 20, 2005, incorporated herein by reference describe how the Completion Unit performs this function. Within the completion unit, linked lists of the data frames assigned to processors/threads represent the data frame order of the data flows. One linked list exists for each data flow which currently has a data frame being processed by a processor/thread. The head of the linked list is associated with a processor/thread. It is from this processor/thread that the next processed data frame is to be taken from and sent out onto the network. When the processed data frame is sent, the head of the linked list is removed and the next element of the linked list is examined; see the referenced applications for details.

U.S. Pat. No. 7,089,555, issued on Aug. 8, 2006, incorporated herein by reference, describes a generic Ordered Semaphore Management Subsystem (herein after referred to as the OSMS system) which employs an ordered semaphore queue. The ordered semaphore queue mirrors the flow queue maintained by the network processor system. It includes an ordered semaphore field (OSF) for each processor/thread in the flow. Each processor/thread resides in one of four states. Only one processor/thread resides in the Semaphore Head (SH) state and is entitled to access a semaphore. The other processors/threads in the ordered semaphore queue must wait until they enter the SH state before they can gain access to a semaphore (for more information concerning the operation of the OSMS system refer to the incorporated application). In those situations where a processor behind the current SH processor/thread wants a different semaphore it must nevertheless wait until it enters the SH state before it can access this different (non-conflicting) semaphore (this condition is often referred to as head of line blocking). This application addresses that situation and provides a solution thereto.

SUMMARY OF THE INVENTION

The invention contemplates an application system which includes one or more shared resources each controlled by a unique semaphore, a plurality of threads adapted to perform ordered and unordered tasks on assigned segments of a continuous data flow, using one or more shared resources controlled by semaphores. The system employs an ordered queue of threads having one semaphore head (SH) thread identifying the next thread in the queue which is entitled to lock a semaphore and in which the next eligible thread in the queue behind the SH thread becomes the SH thread when the current SH thread locks a semaphore.

A storage means is associated with each thread for storing the unique semaphore requested, a valid indicia indicating when set that the semaphore is locked and a pending field for indicating when set that the thread is entitled to the identified semaphore when it becomes unlocked. A first logic circuit in response to a semaphore lock request from an SH thread examines the storage means and locks the requested semaphore if it is not locked by another thread. If the requested semaphore is locked by another thread, it provides an indication that it is locked. A second logic circuit responsive to the indication that the requested semaphore is locked examines the pending fields in the storage means and sets the pending field associated with the SH thread if no other pending field for the requested semaphore is set. The next eligible thread in the ordered semaphore queue is made the SH thread when the pending field is set and the current thread goes to the SHB state. A third logic circuit monitors the status of the requested semaphore and locks the requested semaphore for the pending thread and resets the associated pending field when the requested semaphore becomes unlocked.

DETAILED DESCRIPTION OF THE INVENTION

Figure 1:
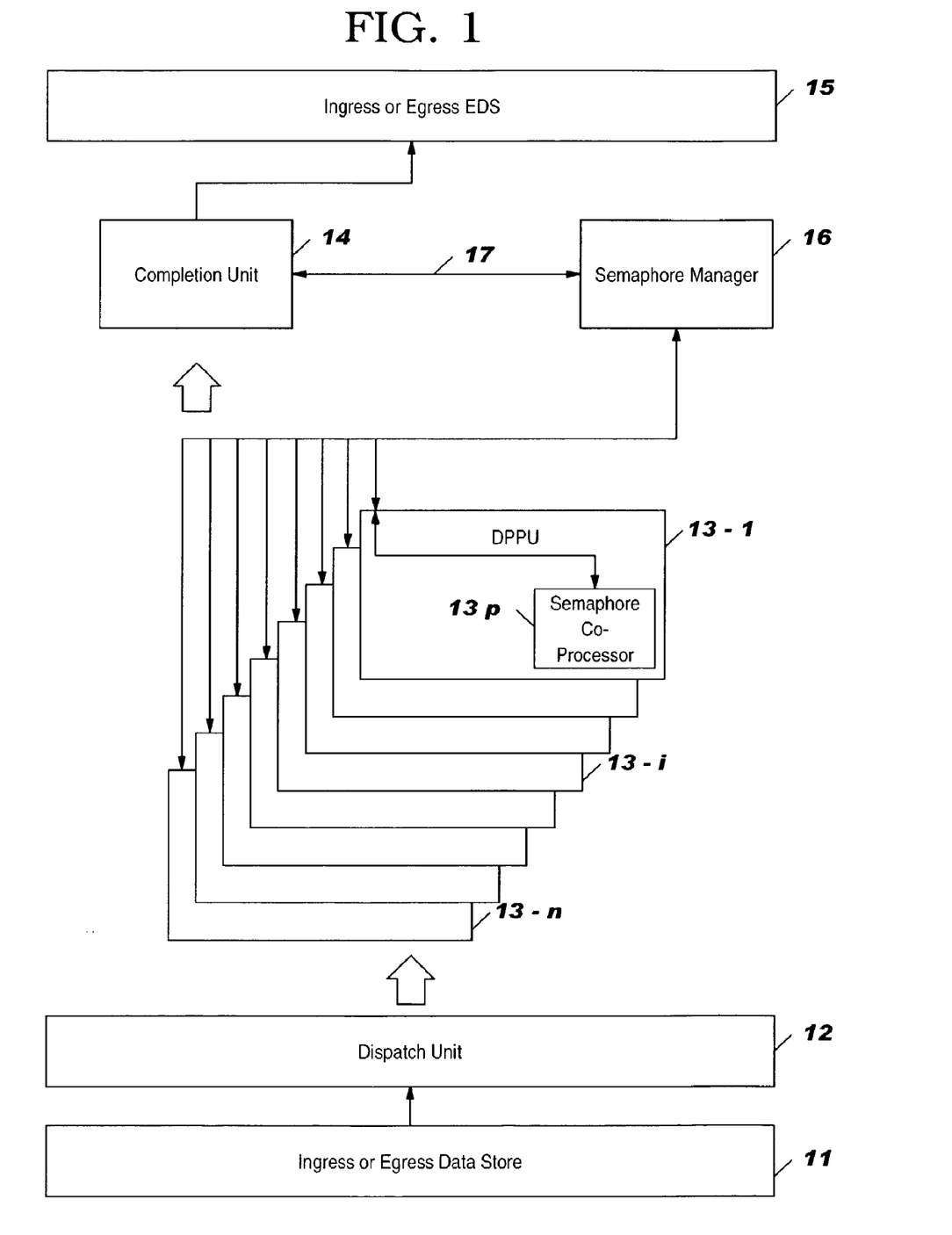
FIG. 1 is a block diagram of an application system which incorporates a semaphore manager subsystem according to the invention.

In FIG. 1 a network processor such as the IBM processor identified above includes an input/output data storage unit 11 which stores a plurality or stream of data frames which require processing. A dispatching unit 12 transfers individual data frames to a plurality of processors 13-1-12-$n$ which process the individual frames received from the dispatching unit 12. The processors 13-1-13-$n$ pass the processed data frames on to a completion unit 14 which reorders the data frames before passing the ordered stream of data frames on to a second input/output unit 15.

Each of the processors 13-1-13-$n$ include a semaphore coprocessor 13$p$ which interfaces a hardware semaphore manager subsystem 16 constructed according to the invention. The semaphore subsystem 16 is implemented in hardware and interfaces with, for example, the Dyatic Protocol Processor Unit (DPPU) of the using processing system. Each DPPU contains multiple threads (4, in the case of the IBM Network Processor) which can each process one data frame. Each DPPU has one Semaphore Co-Processor associated with it. The threads in a given DPPU interface to the one Semaphore Co-Processor within the DPPU. The multiple Semaphore Co-Processors all communicate with the central Semaphore Manager subsystem. The Semaphore Manager subsystem 16 contains all of the tables and control logic to lock, unlock, and arbitrate for semaphores. The semaphore manager 16 communicates with the completion unit 14 over a bus 17.

Figure 2:
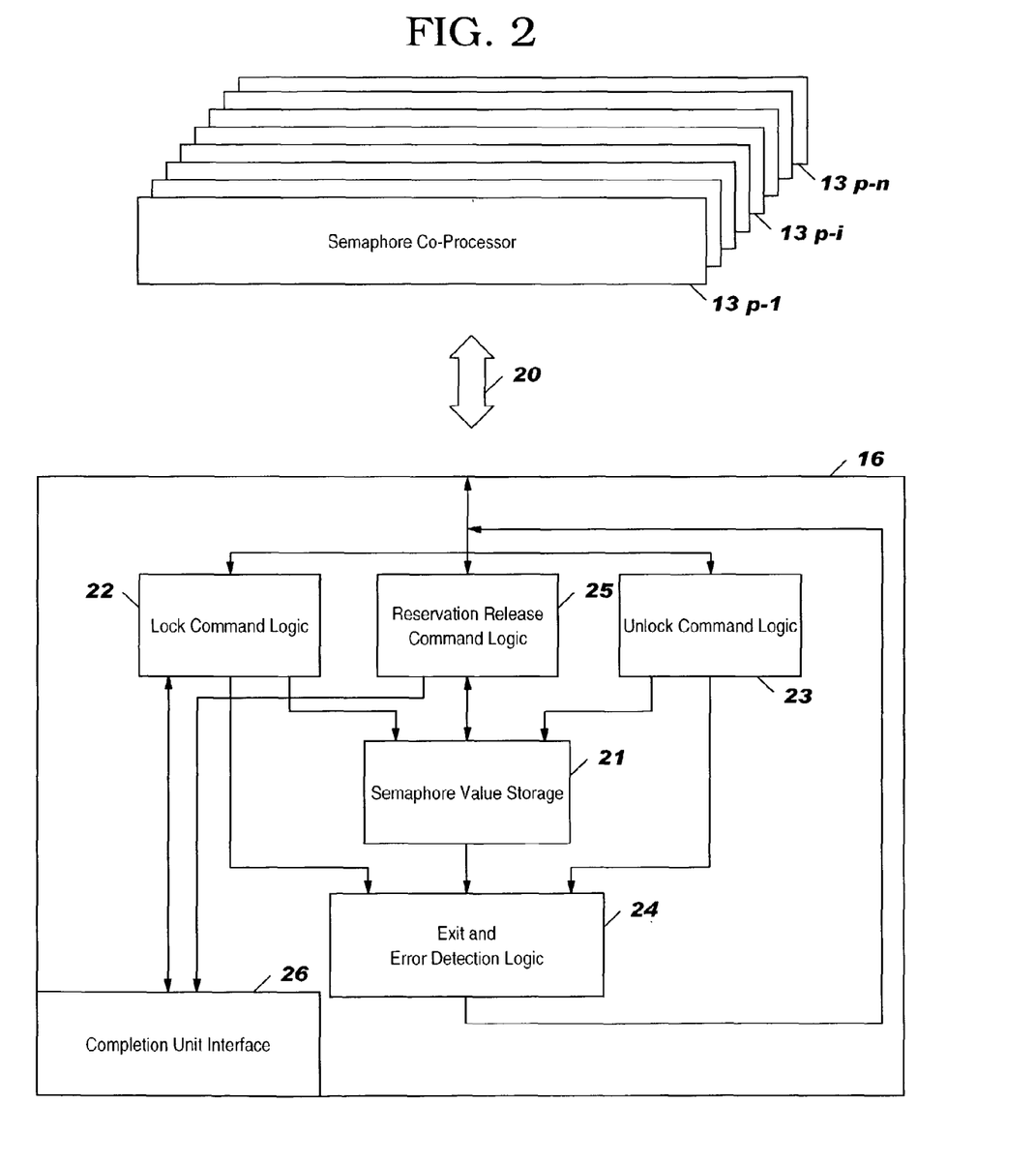
FIG. 2 is a block diagram of a semaphore manager subsystem according to the invention.

In FIG. 2 the semaphore coprocessors 13$p$–1-13$p$-$n$ communicate with the Semaphore Manager subsystem 16 via a bus 20. The subsystem 16 includes a semaphore value storage 21, semaphore lock command logic 22, semaphore unlock command logic 23 and semaphore exit and error detection logic 24. It also includes reservation release command logic 25 and completion unit interface logic 26. Except for the semaphore value storage 21, the lock command logic 22 and exit and error detection logic 24, the remaining components of FIG. 2 operate as described in the incorporated OSMS system application.

Figure 3:
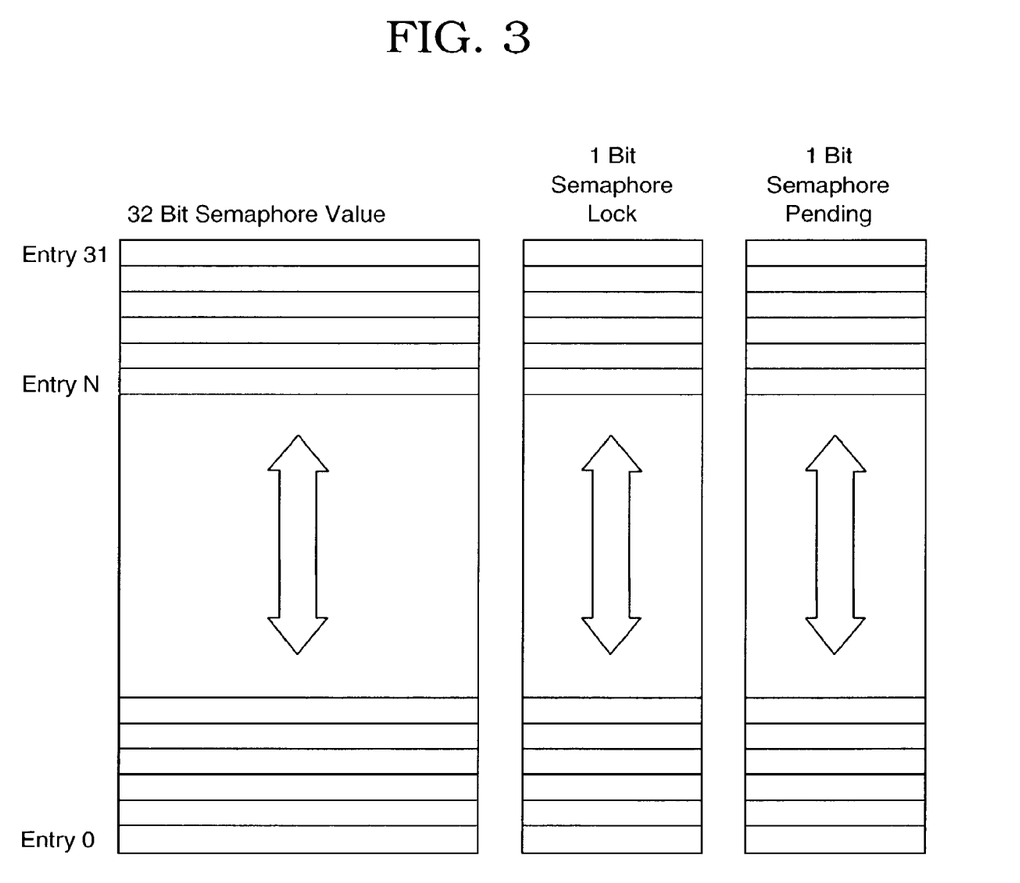
FIG. 3 is a diagram of the semaphore value storage 21 of FIG. 2.

FIG. 3 is a block diagram of the semaphore value storage 21. The storage can be based upon a RAM, CAM, or discrete latches. For each thread there exists exactly three registers. The first register (Semaphore_Value) is a 32 bit register which holds the 32 bit Semaphore Value (Sem_Val) that can be locked by the associated thread. The second register (Semaphore_Lock) is a 1 bit register which indicates if the Sem_Val stored in the associated Semaphore_Value register is locked or unlocked. When the Semaphore_Lock register is set to 1'b, the Sem_Val in the Semaphore_Value register is locked. When the Semaphore_Lock register is reset to '0'b, no Sem_Val is locked by the associated software thread.

The third register (not disclosed in the OSMS system application) is a Semaphore_Pending register. The register has one or more bits Sem_Pending which when set indicate that the associated thread is to be granted the identified and currently locked semaphore when it is unlocked regardless of the fact that it is not in the SH state. If more than one pending level (two or more bits) is used the threads must be prioritized according to their order in the ordered data flow sequence. The use of the pending state will be described below.

A semaphore can be locked when a software thread issues a single command "Semaphore Lock" (Sem_Lock) with two parameters. The first parameter is the "Semaphore Value" (Sem_Val). This is, for example, a 32 bit value which the thread wishes to lock. The second parameter is the "Timeout Enable" (Timeout_Enable) bit. When the Timeout Enable bit is set and the requested semaphore is already locked by a different thread, the Semaphore Lock command will terminate without locking the semaphore.

In the preferred embodiment, each thread has an assigned register in the semaphore value storage and is thus identified as the source of the semaphore value requested. Alternatively, the requested semaphore value could be placed in any available register along with a thread ID. The association could be made dynamically by providing thread ID information with the Sem_Val.

The OSMS system application generates an Ordered Semaphore Field (OSF) for each thread in the data flow. The fields are arranged in an ordered queue that mirrors the data flow queue in the system completion unit. Each individual OSF is assigned one of four states (Semaphore Head (SH), Behind Semaphore Head (BSH), Semaphore Head Behind (SHB) or Skip). The SH state is assigned to only one thread in a data flow at any given time and only the SH thread is eligible to acquire a semaphore. When the SH thread locks the requested semaphore, the SH state moves down the queue to the next eligible thread in the ordered semaphore queue.

If the thread behind the SH thread is requesting a different (available) semaphore than the SH thread, it must wait until it becomes the SH thread before it can gain access to the available different semaphore. The present invention in certain circumstances eliminates this waiting period and thus improves overall system performance.

This is accomplished by providing a new (pending) state in the semaphore value storage 21. When a thread N in the SH state issues a semaphore lock command for a currently locked semaphore, the semaphore manager places the thread N in the pending state by setting the corresponding pending register in storage 21 provided no other thread is pending on that semaphore. At the same time the semaphore manager removes thread N from the SH state. This action advances the SH state to the next eligible thread N+1 in the ordered semaphore queue. If thread N+1 is requesting a different non-conflicting semaphore it will be granted while thread N waits in the pending state for the previously requested semaphore to become available. The sequence can advance as described until an SH thread requests a locked semaphore value which also has a requesting thread in the pending state for that semaphore. In the interests of simplicity of explanation, the invention will be described with a single level for the pending state. However, by adding additional levels to the pending state, the SH state could obviously skip over two or more consecutive threads pending on the same semaphore value.

Figure 4A:
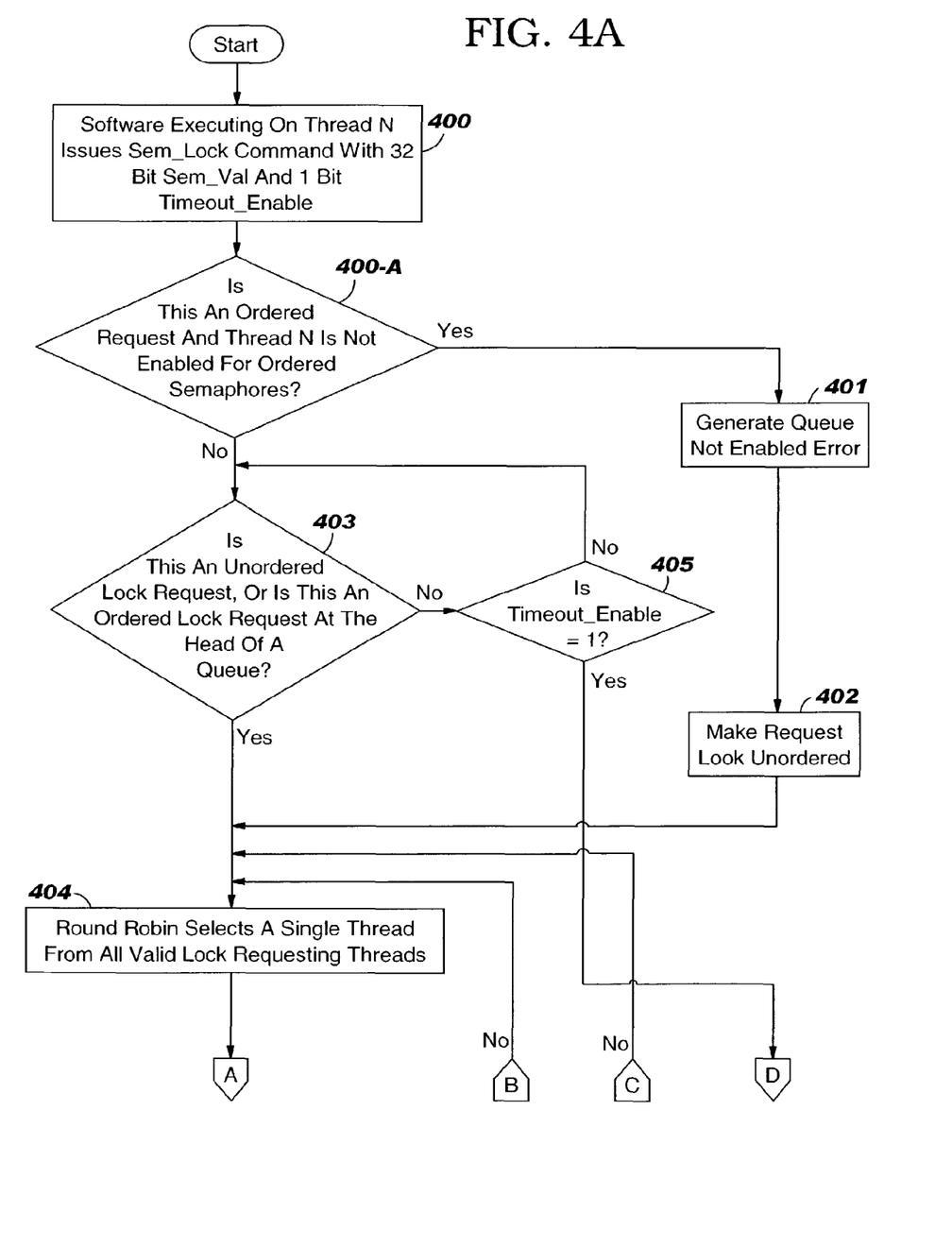
FIGS. 4A and 4B are flow diagrams defining (on a per thread basis) the lock command logic 22 of FIG. 2; and, FIG. 5 is a flow diagram defining the error and exit logic 24 of FIG. 2, which is executed upon a thread exit.
Figure 4B:
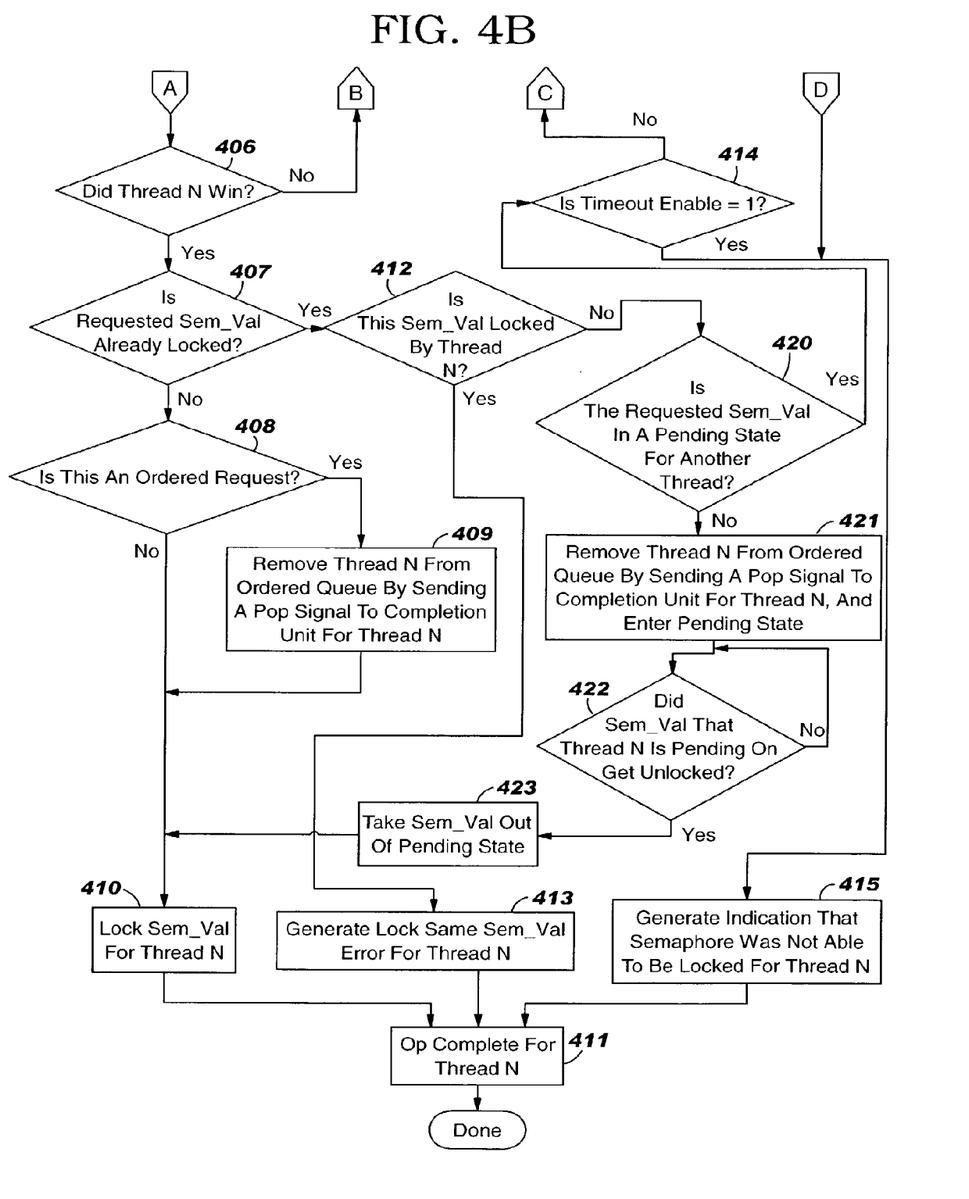

FIGS. 4A and 4B are similar to FIGS. 4A and 4B of the OSMS system, however they include additional logic to implement the new functionality provided by the new pending state. The figures illustrate the function of the lock command logic as modified by the pending state. To the extent possible identical reference numerals will be used for identical logic functions.

Directional blocks A, B, C and D indicate the connections between the two figures. The process starts when a thread N issues a semaphore lock command which includes a 32 bit semaphore value and a 1 bit time out enable value 400. If the request is an ordered semaphore request and thread N is not enabled for ordered semaphores 400-A, a queue not enabled error is generated 40 land the request is changed to an unordered request 402. If it is not the former, it is examined to determine if it is an unordered request or an ordered request at the head of a queue 403. If the request is either of the above it enters a round robin 404 for selection and exits FIG. 4A at A. If the answer in block 403 is "no" (in which case it is an ordered request which is not the head of a queue) it is examined to determine if the timeout enable bit is set. If the timeout enable bit is not set 405 the request loops back to 403. If the bit is set it exits FIG. 4A at D.

The non-winning threads at block 406 loop back to block 404 while the semaphore request from the winning thread is examined 407 in the semaphore value storage to determine if that semaphore value is currently locked. If the semaphore value is not locked it is examined in block 408 to determine if the request is ordered.

If the request is ordered, the thread is removed from the ordered queue by sending a Pop signal 409 and the semaphore value requested is locked 410 for thread N. If the request was not ordered, the requested semaphore value is locked for thread N 410 and in either case the operation for thread N is complete 411.

If the locked semaphore value requested by thread N is already locked by thread N 412, a lock same semaphore value error for thread N is generated 413 and the operation completes at 411. If the requested semaphore value 412 was not locked by thread N the Sem_Pending registers in storage 21 are examined 420 to determine if the requested Sem_Value is in the pending state for another thread; if it is, time out enable bit is examined 414. If the bit is set an indication that the semaphore could not be locked is generated 415 and the operation completes 411. If the timeout enable bit is not set the request loops back through C to block 404.

If the semaphore value requested by thread N is not pending for another thread, thread N is removed from the ordered semaphore queue by sending a Pop signal 421 to the completion unit interface 26 which also moves the SH state to the next qualified thread in the ordered semaphore queue (for the details of this operation see the OSMS system application). Thread N waits for the requested semaphore to be unlocked 422. When the requested semaphore value is unlocked, the pending state for thread N is reset 423 and the requested semaphore value is locked for thread N 410.

With a single level for the pending state a thread desiring a non-conflicting semaphore can bypass only one thread vying for a locked semaphore. Threads desiring a non-conflicting semaphore will continue to bypass the single thread in the pending state until the first thread desiring a conflicting semaphore is reached. By expanding the number of levels of the pending state, a thread can bypass as many consecutive threads vying for the same locked semaphore. This can be accomplished by increasing the number of bits in the Sem_Pending field. For example, two bits would allow up to three consecutive threads vying for the same locked semaphore to be bypassed by a thread seeking to lock a non-conflicting available semaphore. All that is required is to assign a priority to the different values of the Sem_Pending field so that the order or sequence of the threads is not violated.

If two bits are used 00 can be assigned to the reset state of the pending field and 01, 10 and 11 assigned to priority levels 1, 2 and 3, respectively. When a locked semaphore is unlocked the 01 pending thread will be granted the requested semaphore and the threads at the 10 and 11 pending levels (if any) will be elevated to levels 01 and 10, respectively. Resetting the pending level of the thread granted the requested semaphore and the adjustment of the priority levels of the other threads can be easily accomplished by subtracting 1 from their current values.

Figure 5:
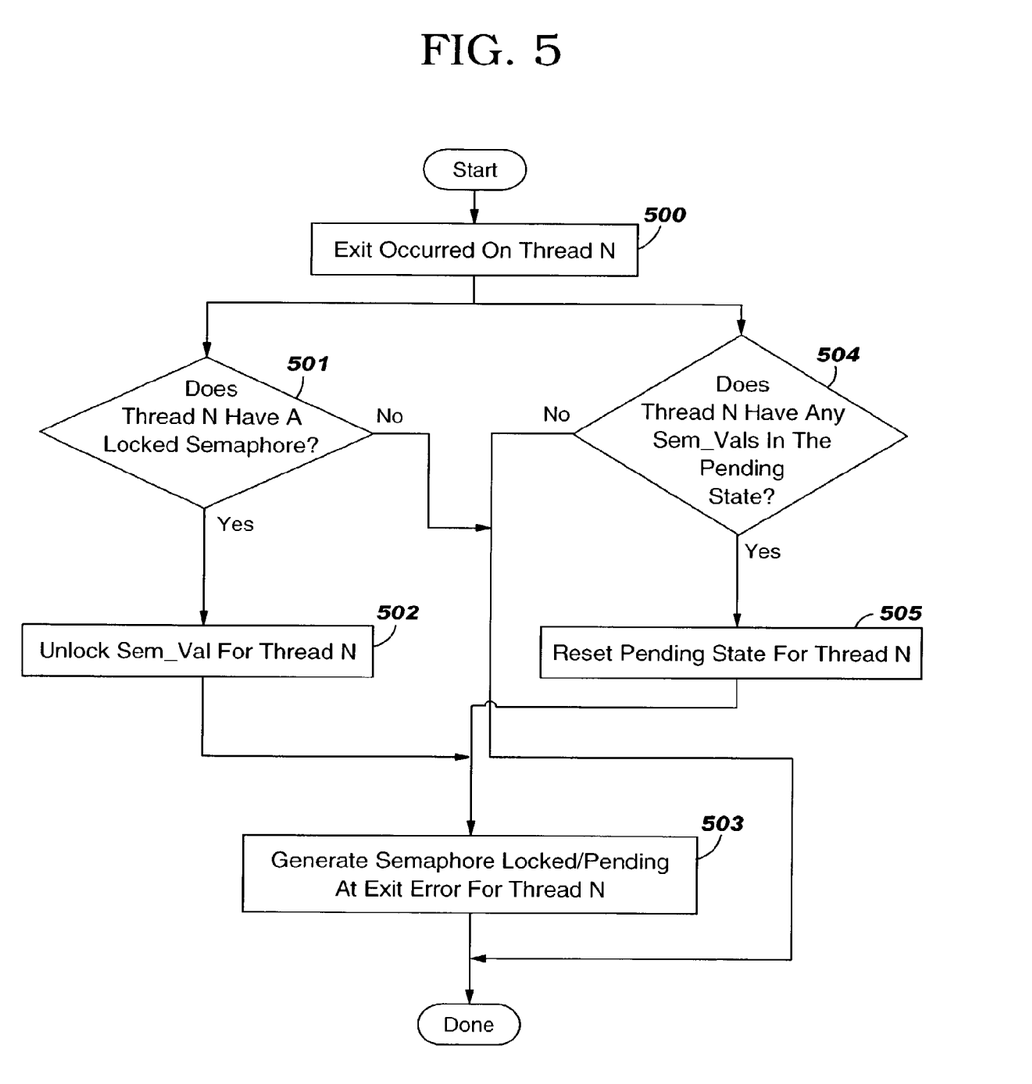

FIG. 5 illustrates the steps needed to handle errors that occur on thread exit. When a thread N exits 500, FIG. 5, the logic checks the semaphore value storage associated with thread N. If thread N has not unlocked its semaphore 501, it is unlocked 502 and a semaphore locked at exit error 503 is generated for thread N. The logic also checks the Sem_Pending field 504. If the field is set the logic resets the Sem_Pending field 505 and signals an error at exit condition 503.

The foregoing is illustrative of the present invention and is not to be construed as limiting the invention. While several embodiments of this invention have been described in detail, those skilled in this art will readily appreciate that many modifications are possible without materially departing from the novel teachings and advantages of this invention. Accordingly, all such modifications are intended to be included within the scope of this invention as defined by the claims. In the claims, means-plus-function clauses are intended to cover the structures described herein as performing the recited function and structural functional equivalents thereof. Therefore, it is to be understood that the foregoing is illustrative of the present invention and is not to be construed as limited to the specific embodiments disclosed, and that modifications to the disclosed embodiments, as well as other embodiments, are intended to be included within the scope of the claims appended hereto.

We claim:

1. In a multi-processor application system including, one or more shared resources each controlled by a unique semaphore, an ordered queue of threads having one semaphore head thread defining an eligible thread in the ordered queue of threads entitled to lock a semaphore and in which a next eligible thread in the ordered queue of threads behind the semaphore head thread becomes a new semaphore head thread when a current semaphore head thread locks the unique semaphore, wherein only the eligible semaphore head thread is eligible to acquire a unique semaphore, an ordered semaphore management subsystem comprising:

a storage means associated with a requesting semaphore head thread requesting the unique semaphore and including a field for storing the unique semaphore requested, a valid field for indicating when set a locked status of the unique semaphore requested, and a pending field for indicating a priority when set that the requesting semaphore head thread is entitled to the unique semaphore requested when it becomes unlocked, wherein the pending field includes two or more bits for indicating the priority;

a first logic circuit responsive to a semaphore lock request from the requesting semaphore head thread for examining the storage means and locking the unique semaphore requested if the unique semaphore requested is not locked by another thread and if the unique semaphore requested is locked by another thread providing an indication that the unique semaphore requested is locked;

a second logic circuit responsive to the indication that the unique semaphore requested is locked for examining a plurality of pending fields in the storage means and setting the pending field associated with the requesting semaphore head thread if no other pending field for the unique semaphore requested is set to form a pending thread and making a next eligible thread in the ordered queue the requesting semaphore head thread when the pending field associated with the requesting semaphore head thread is set; and a third logic circuit for monitoring status of the unique semaphore requested and unlocking the unique semaphore requested for the pending thread and resetting an associated pending field when the unique semaphore requested becomes relocked.

2. The ordered semaphore management subsystem set forth in claim 1 in which the storage means includes an assigned location for each thread in the multi-processor system.

3. The ordered semaphore management subsystem set forth in claim 1 in which the storage means associated with a thread requesting the unique semaphore requested includes a field for storing an identity of the thread requesting the unique semaphore requested which is used for accessing the field.

4. The ordered semaphore management subsystem set forth in claim 1, in which the pending fields have more than one level wherein a level is prioritized in order of the ordered queue of threads.

5. In an application system including, one or more shared resources each controlled by a unique semaphore, a plurality of threads adapted to perform ordered and unordered tasks on assigned segments of a continuous data flow, using one or more shared resources controlled by semaphores, an ordered queue of threads having one semaphore head thread defining an eligible thread in the ordered queue of threads entitled to lock a semaphore and in which a next eligible thread in the ordered queue of threads behind the semaphore head thread becomes the semaphore head thread when a current semaphore head thread locks the unique semaphore, wherein only the eligible semaphore head thread is eligible to acquire a unique semaphore, an ordered semaphore management method comprising the steps:

generating a storage associated with a requesting semaphore head thread of the plurality of threads requesting the unique semaphore for storing the unique semaphore requested, a valid indicia for indicating when set a locked status of the unique semaphore requested, and pending field for indicating a priority when set that the requesting semaphore head thread is entitled to the unique semaphore requested when the unique semaphore requested becomes unlocked, wherein the pending field includes two or more bits for indicating the priority;

responsive to a semaphore lock request from the requesting semaphore head thread, examining the storage and locking the unique semaphore requested if the unique semaphore requested is not locked by another thread and if the unique semaphore requested is locked by another thread providing an indication that the unique semaphore requested is locked;

responsive to the indication that the unique semaphore requested is locked, examining a plurality of pending fields in the storage and setting the pending field associated with the requesting semaphore head thread if no other pending field for the unique semaphore requested is set and making the next eligible thread in the ordered queue the requesting semaphore head thread when the pending field associated with the requesting semaphore head is set; and monitoring a status of the unique semaphore requested and unlocking the unique semaphore requested for the pending thread and resetting an associated pending field when the unique semaphore requested becomes relocked.

6. The ordered semaphore management method set forth in claim 5 in which the storage includes an assigned location for each thread in the multi-processor system.

7. The ordered semaphore management method set forth in claim 5 in which the storage associated with a thread requesting the unique semaphore requested includes a field for storing an identity of the thread requesting the unique semaphore requested which is used for accessing the field.

8. The ordered semaphore management method set forth in claim 5, in which the pending fields have more than one level wherein a level is prioritized in order of the ordered queue of threads.

* * * * *